3,134,709
WATER-RESISTANT CONSOLIDATED STRUCTURAL UNITS
Gordon E. Brown, Seattle, Wash., assignor to Monsanto Company, a corporation of Delaware
No Drawing. Filed Aug. 3, 1960, Ser. No. 47,152
4 Claims. (Cl. 161—162)

This invention relates to consolidated structural units fabricated from particulate cellulosic waste materials. More particularly, the invention relates to structural particle boards or panels made from comminuted wood, or other cellulosic waste, having water-resistant surfaces.

Particle board is a generic term used to describe boards, panels, etc., made by compressing a mixture consisting essentially of comminuted cellulosic waste materials, such as wood fibers or chips, etc., and a thermosetting binder under sufficient heat to set the binder. The resiliency and low cost of particle board makes it particularly suited to such interior applications as wall-paneling, subflooring for floor tile or linoleum, etc. However, the poor water-resistance of particle board has limited its use in applications where there is a present danger of flooding caused by broken or defective water pipes or fittings, overflow from sinks, fire sprinklers, or even from ordinary washing of floors. When used as subflooring for, e.g., floor tile, the presence of water between the floor tile and the particle board causes a non-uniform swelling of the surface particles which results in rough flooring and rupture of the adhesive bond.

It is an object of this invention to provide novel consolidated structural units.

Another object is the provision of novel particle board having a high degree of water-resistance.

A further object is the provision of a novel water-resistant particle board which is commercially competitive with other conventional subflooring materials for use in applications where water splattering or occasional emersion is a factor.

These and other objects are attained by surfacing particle board with a dense resinified layer of particulate wood bark.

The following examples are given in illustration of this invention and are not intended as limitations thereof. Where parts are mentioned, they are parts by weight.

*Example I*

(a) One hundred parts of Douglas fir wood chips are intimately mixed with 10 parts of a liquid phenol-formaldehyde resin containing about 40% solids by weight prepared by condensing one molar proportion of phenol with 2 molar proportions of formaldehyde in the presence of 0.2 molar proportion of sodium hydroxide.

(b) Similarly, in a separate mixer, 25 parts of particulate (5 mesh average particle size) cork fraction of bark from Douglas fir is intimately mixed with 2.5 parts of the above liquid phenol-formaldehyde resin.

(c) A chipboard is prepared by felting a uniform ¼" mat of the resin-coated bark in the bottom of a mold, felting thereon a uniform 3½" layer of the resin-coated wood and finally felting thereon a uniform ¼" surface layer of the resin-coated bark. A total of about 10% by weight of bark, based upon the weight of the wood chips, is employed. The mold is placed in a hydraulic press and compressed cold to a thickness of about 1½" at 100 p.s.i. The compacted mass is removed from the mold and transferred to a second hydraulic press where it is compressed for 10 minutes at 325° F. at a pressure of about 250 p.s.i. to make a particle board measuring ¾" in thickness. A dense, smooth and hard-surfaced board is obtained.

(d) The water-resistivity of the chipboard is determined by means of a swelling test. In this test, a 250 ml. Erlenmeyer flask having a neck opening measuring about 26 mm. in diameter is partially filled with a 5% aqueous solution of a detergent comprised essentially of the ammonium salt of lauryl alcohol sulfate and is then up-ended on the surface of the chipboard. After 16 hours exposure to the detergent solution, the exposed area of the board is measured and found to have increased by about 0.02" (or by about 2.7%) in thickness due to swelling.

*Example II*

A conventional chipboard is prepared for comparative purposes. A portion of the resin-coated wood chips prepared in Example I(a) are felted in a uniform 4" mat into the mold employed in Example I. A chipboard is then prepared and evaluated for its water-resistivity following the procedures of Examples I(c) and (d). Measurements show the exposed area of the board to have increased by 0.21" (or by about 28%) in thickness due to swelling.

The particle board on this invention consists essentially of a comminuted cellulosic waste core surfaced on either side with particulate wood bark. A thermosetting resin is employed as binder for both the comminuted cellulosic waste and the bark.

The comminuted cellulosic waste employed in the practice of this invention may be wood chips, wood fibers, bagasse, crushed corn cobs, etc. Wood, especially Douglas fir, is preferred. Other desirable woods which may be employed include oak, maple, pine, cedar, hemlock etc.

Bark from any of the bark-bearing trees may be employed, Douglas fir bark being preferred because of its ready-availability as a waste material in the very mills likely to be practicing this invention. Other desirable barks include oak, pine, maple, cedar, hemlock, etc. In general, the least fibrous barks will provide the greatest water-resistivity. However, even fibrous bark will provide a marked improvement with respect to water-resistivity over the ordinary untreated particle boards now in use. Thus, in a preferred embodiment, the cork fraction of the bark is employed to maximize the water-resistivity of the particle board produced. In any event, the bark employed should be in the form of finely divided particles having an average particle size of from about 3 to 100 on the U.S. sieve scale.

This invention is not limited as to the nature of the thermosetting resin employed as the binder. Conventional binders known to those skilled in the art may be employed. However, it is preferred to employ aqueous phenol-formaldehyde condensates prepared by condensing one molar proportion of phenol with from 1 to 3.5 molar proportions of formaldehyde in the presence of from about 0.1 to 1.5 molar proportions of an alkali metal hydroxide such as sodium hydroxide, lithium hydroxide, potassium hydroxide, etc. Phenol-formaldehyde resins of higher alkalinity may also be employed but with some sacrifice of water-resistance of the bark surface of the particle board. Other suitable binders include resorcinol-formaldehyde condensates, urea-formaldehyde condensates, melamine-formaldehyde condensates, polyepoxides, etc.

From about 1 to 20 weight percent, based upon the weight of the comminuted cellulosic waste, of thermosetting resin solids should be employed in conjunction with the comminuted cellulosic waste comprising the core materials of the particle board of this invention. In a preferred embodiment, from about 5 to 6 weight percent of thermosetting resin solids are employed. The proportion of thermosetting resin solids employed, as binder, in conjunction with the particulate bark should range from about 0.25 to 30 weight percent, based upon the weight of the bark; the lower limit providing adequate strength but the higher proportions providing finer and harder surfaces.

The thermosetting resin may be applied to the comminuted cellulosic waste and to the particulate bark by means of conventional techniques. In general, these conventional techniques may be categorized as dry, damp or wet processes. The dry process is generally employed in association with wood chips and comprises intimately comingling a liquid or solid resin with the wood chips in a conventional mixer. Liquid resins are commonly sprayed onto the wood chips in the mixer. The damp and wet processes are generally, but not necessarily, employed in conjunction with wood fibers or with other fibrous cellulosic wastes. In the damp process, a large amount of water is desired; i.e., from 30 to 50% water. Generally, the amount of moisture in the fibers is determined and the resin solution is then diluted to make us the desired amount. The resin solution may then be sprayed upon the fibers or mixed therewith in a conventional mixing apparatus. In the wet process, the wet fibers are slurried in water. An aqueous resin solution is added to the slurry, and then sufficient alum or other precipitating agent such as sulfuric acid is added to the slurry to adjust the pH thereof to from about 3.0 to 5.0 and to precipitate the resin onto the fibers. The above techniques may also be employed to apply the thermosetting resin to the particulate bark.

In other embodiments, the comminuted cellulosic waste or the particulate bark may be treated before use with such conventional additives or modifiers as wax (either dry, molten or in emulsion), coloring pigments or dyes, mold lubricants, etc.

The bark-surfaced particle board of this invention is made by depositing in alternate strata: (1) a mat of resin-coated particulate bark, (2) a mat of resin-coated comminuted cellulosic waste, and (3) a second mat of the resin-coated particulate bark. Conventional molds, etc. may be employed. The thickness of each stratum, as initially deposited, will be governed by many considerations known to those skilled in the art. Among such considerations are included, for example, the intended thickness of the finished particle board, the desired density of the finished particle board, the intended relative thickness of the bark layers in proportion to the total thickness of the finished particle board, the size and nature of the comminuted cellulosic waste, etc. It is obvious that these considerations are interrelated.

Regardless of which of the above processes, i.e., dry, damp, or wet, are employed, a bulky multi-layered mass is obtained which must be prepressed to reduce the bulk and obtain a practical preform for the final molding step. If excess moisture introduced through the use of the damp or wet process is present, said excess moisture should be removed during the prepressing and the subsequent final pressing steps. To accomplish this, one broad face of the prepressing mold and also of the final press mold, if such is used, is in the form of a fine mesh screen.

The prepress is generally effected cold at pressures of from about 50 to 200 p.s.i. However, moderate temperatures may be employed using care not to thermoset the binder. The prepressed board is then pressed to its final dimension under heat and pressure. In this stage, temperatures of from about 250 to 400° F. are employed in conjunction with pressures of from about 100 to 1000 p.s.i. If an excessive quantity of moisture is present, an initial high pressure, i.e., above about 500 p.s.i., should be applied, followed by a brief release of pressure to permit escape of volatiles; finally completing the pressing under higher pressure.

The consolidated structural units of this invention exhibit marked water-repellency with an associated freedom from the dimensional distortion commonly resulting from the use of such structural units in damp or wet locations.

It is obvious that many variations may be made in the products and processes herein described without departing from the spirit and scope of this invention.

What is claimed is:

1. A consolidated structural unit comprising a comminuted cellulosic waste core surfaced with a particulate bark fraction consisting solely of the cork fraction, the individual particles of said cellulosic waste and said cork fraction being cohesively bonded with a thermosetting resin.

2. A consolidated structural unit as in claim 1 wherein the comminuted cellulosic waste is comminuted wood and the cork fraction is the cork fraction of the bark from Douglas fir.

3. A consolidated structural unit as in claim 1 wherein the thermosetting resin is an aqueous phenol-formaldehyde resin prepared by condensing 1 mol of phenol with from 1 to 3.5 mols of formaldehyde in the presence of from 0.1 to 1.5 mols of an alkali metal hydroxide.

4. A consolidated structural unit as in claim 1 wherein the comminuted cellulosic waste is comminuted wood, the cork fraction is the cork fraction of the bark from Douglas fir and the thermosetting resin is an aqueous phenol-formaldehyde resin prepared by condensing 1 mol of phenol with from 1 to 3.5 mols of formaldehyde in the presence of from 0.1 to 1.5 mols of an alkali metal hydroxide.

References Cited in the file of this patent

UNITED STATES PATENTS

| | | |
|---|---|---|
| 2,686,143 | Fahrni | Aug. 10, 1954 |

FOREIGN PATENTS

| | | |
|---|---|---|
| 506,941 | Canada | Nov. 2, 1954 |
| 530,993 | Canada | Oct. 2, 1956 |
| 1,005,111 | France | Dec. 12, 1951 |